United States Patent Office.

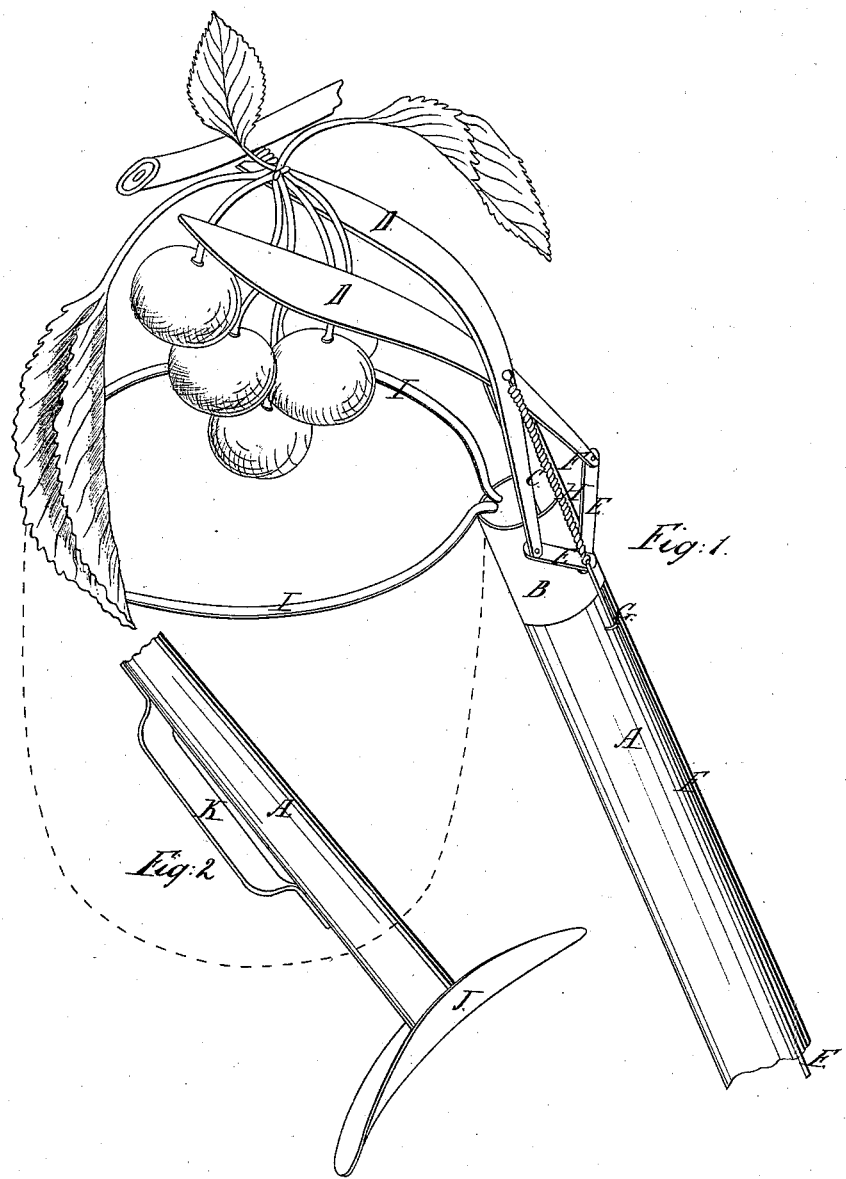

JOHN H. ADAMS, OF MARTINSVILLE, INDIANA.

Letters Patent No. 91,698, dated June 22, 1869.

IMPROVEMENT IN FRUIT-PICKER.

The Schedule referred to in these Letters Patent and making part of the same.

*To all whom it may concern:*

Be it known that I, JOHN H. ADAMS, of Martinsville, in the county of Morgan, and State of Indiana, have invented a new and improved Fruit-Picker; and I do hereby declare that the following is a full, clear, and exact description thereof, that will enable skilled artisans to make and use the same, reference being had to the accompanying drawing, and to the letters of reference marked thereon, making part of this specification.

This invention consists in a pair of curved shears, attached to the upper end of a suitable pole or handle, and so constructed and arranged as to be conveniently operated by means of a wire or cord running along the top of the pole, and extending to within reach of the operator, whereby fruit of every description may be readily clipped from the tree;.and in combination therewith, the arrangement of a basket or hose, the mouth of which is situated under the curved blades of the shears, in proper position to receive the fruit, and by which it may be safely conveyed to the ground or to a suitable receptacle, without injury by bruising.

Figure 1 is a perspective view of the implement.

Figure 2 is a perspective view of the lower end of the pole A, showing the abutment-piece at the end, for resting the implement against the body, and the hand-hold a suitable distance up the pole, for more conveniently handling the implement.

Similar letters of reference indicate corresponding parts in the several figures.

A is the pole of the implement, which may be made in sections of suitable length, and coupled together in any usual or convenient manner.

The top of the pole is furnished with a ferrule, B, that secures piece C thereto, that extends upward, and to the top of which the shears are pivoted, at the crossing of the shear-blades D, as shown.

The lower ends of the blades or shanks, being that part below the crossing, are connected together by means of the toggle-bars E, as shown, and from the pin connecting the two toggle-bars a wire or cord, F, extends down along the top of the pole, through suitable eyes, G, to keep it in place, to within convenient reach of the operator, by means of which the blades D are closed to cut off the stems of the fruit.

The blades are kept open in the position shown, to receive the stems of the fruit, by means of the spiral spring H, which connects the lower ends of the toggle-bars with the rivet at the crossing of the blades, and the blades are closed upon the stems, to cut them off, by pulling upon the wire F, as will be readily understood.

The fruit drops into a flexible basket or hose, indicated by the red dotted lines, which is attached to the circular wire I, attached to the upper end of the pole, in suitable relation to the shears, as shown, and which forms the mouth of the basket or hose.

The lower end of the pole is furnished with a curved rest or foot-piece, J, of suitable form to rest against the body of the operator, for the purpose of enabling him to more easily and securely hold the implement, and a hand-hold, K, attached to the under side of the pole, at convenient reach from the operator, enables him to more easily manipulate it.

The advantage of this arrangement will be more readily appreciated when it is considered that a hose for conducting the fruit to the ground is not adapted to all kinds of fruit, being more especially suited to apples; hence, for cherries and other small fruits, and for peaches, I give preference to the use of a flexible basket or sack large enough to hold, say one gallon, more or less. As such a quantity would have some weight, I have provided the foot-piece J and hand-hold K as a means of more conveniently handling the implement.

It will be readily perceived that the advantage of clipping the steams of the fruit, instead of pulling it loose from the stem by means of implements furnished with fingers or pegs, requiring usually, also, an amount of force that endangers bruising the fruit, will be found very great, as when the stem is left attached to the fruit it will keep longer, and hence will be in a more marketable condition.

Having thus fully described my invention,

What I claim as new, and desire to secure by Letters Patent, is—

The curved shears D, arranged to be operated by means of the toggle-bars E, wire or cord F, and spiral spring H, in combination with the circular ring forming the mouth of the flexible basket or hose, abutment-piece J, and hand-hold K, all attached to the pole A, and arranged substantially as and for the purpose set forth.

JOHN H. ADAMS.

Witnesses:
O. F. MAYHEW,
WM. H. WEEKS.